(12) United States Patent
Morimoto et al.

(10) Patent No.: US 11,248,703 B2
(45) Date of Patent: Feb. 15, 2022

(54) METAL GASKET

(71) Applicant: NOK Corporation, Tokyo (JP)

(72) Inventors: Takeo Morimoto, Shizuoka (JP);
Misaki Gushiken, Shizuoka (JP)

(73) Assignee: NOK CORPORATION

( * ) Notice: Subject to any disclaimer, the term of this patent is extended or adjusted under 35 U.S.C. 154(b) by 0 days.

(21) Appl. No.: 15/126,110

(22) PCT Filed: Mar. 13, 2015

(86) PCT No.: PCT/JP2015/057513
§ 371 (c)(1),
(2) Date: Sep. 14, 2016

(87) PCT Pub. No.: WO2015/141587
PCT Pub. Date: Sep. 24, 2015

(65) Prior Publication Data
US 2017/0074402 A1    Mar. 16, 2017

(30) Foreign Application Priority Data
Mar. 18, 2014    (JP) .............................. JP2014-054841

(51) Int. Cl.
*F16J 15/08*    (2006.01)

(52) U.S. Cl.
CPC ...... *F16J 15/0818* (2013.01); *F16J 2015/085* (2013.01); *F16J 2015/0856* (2013.01)

(58) Field of Classification Search
CPC ............. F16J 15/0818; F16J 2015/0856; F16J 2015/085
See application file for complete search history.

(56) References Cited

U.S. PATENT DOCUMENTS 5,582,415 A * 12/1996 Yoshida ............... F16J 15/0825
  277/592
6,247,704 B1 * 6/2001 Battistoni .............. F16J 15/122
  277/592

(Continued)

FOREIGN PATENT DOCUMENTS

CN    101163909 A    4/2008
CN    101228377 A    7/2008

(Continued)

OTHER PUBLICATIONS

International Search Report dated Sep. 24, 2015 from International Application No. PCT/JP2015/057513.
Japanese Office Action for Patent Application No. JP 2016-508698 dated Sep. 11, 2018 (4 pages).
First Chinese Office Action for Patent Application No. CN 201580014643.4 dated Apr. 19, 2017 (11 pages).

(Continued)

*Primary Examiner* — Vishal A Patel
*Assistant Examiner* — Thomas L Neubauer
(74) *Attorney, Agent, or Firm* — Harness, Dickey & Pierce, P.L.C.

(57) ABSTRACT

A metal gasket which enables improvement of sealing properties by making sufficient compression of a full bead possible even if elastic coating is formed along the full bead. In the gasket (1) having a full bead (13), formed on a metal substrate (10), having a mountain-shaped protruding surface formed on one side in a thickness direction and a valley-shaped recessed surface formed on the other side in the thickness direction, elastic coating (20) is formed on the whole surface of the protruding surface of the full bead (13), and the elastic coating (20) is formed on the recessed surface of the full bead (13), except a slit-shaped elastic coating-free section (14) along a bottom section (13a) of the recessed surface.

2 Claims, 4 Drawing Sheets

(56) References Cited

U.S. PATENT DOCUMENTS

| | | | |
|---|---|---|---|
| 6,517,085 B2* | 2/2003 | Udagawa | F16J 15/0818 |
| | | | 277/592 |
| 7,011,313 B2* | 3/2006 | Ueta | F16J 15/0818 |
| | | | 277/594 |
| 2002/0017763 A1 | 2/2002 | Udagawa et al. | |
| 2005/0189724 A1 | 9/2005 | Schmitz | |
| 2009/0229106 A1 | 9/2009 | Nikamoto et al. | |
| 2010/0086769 A1 | 4/2010 | Yokota et al. | |
| 2011/0192369 A1 | 8/2011 | Schmitz | |

FOREIGN PATENT DOCUMENTS

| | | |
|---|---|---|
| CN | 101678643 A | 3/2010 |
| EP | 1180622 A1 | 2/2002 |
| JP | 200213640 | 1/2002 |
| JP | 2002054745 | 2/2002 |
| JP | 2003056707 | 2/2003 |

OTHER PUBLICATIONS

Second Chinese Office Action for Patent Application No. CN 201580014643.4 dated Nov. 15, 2017 (12 pages).
Third Chinese Office Action for Patent Application No. CN 201580014643.4 dated Aug. 1, 2018 (7 pages).
International Preliminary Report on Patentability and Written Opinion for Patent Application No. PCT/JP2015/057513 dated Jun. 9, 2015 (12 pages).
Chinese Notification of Reexamination for Patent Application No. CN 201580014643.4 dated May 14, 2019 (8 pages).
Chinese Notification for Decision of Reexamination for Patent Application No. CN 201580014643.4 dated Oct. 30, 2019 with English translation (16 pages).
Canadian office action for corresponding Application No. 2,941,097 dated Apr. 21, 2021 (4 Pages).
Second Canadian office action for corresponding Application No. 2,941,097 dated Nov. 1, 2021 (4 Pages).

* cited by examiner

METAL GASKET

FIELD OF THE INVENTIONS

The present invention relates to a metal gasket and specifically to a metal gasket interposed between facing surfaces of two counterpart members in a compressed state and in which elastic coating is formed on a metal substrate having a full bead particularly having spring properties formed.

BACKGROUND OF THE INVENTIONS

A metal gasket is fastened by a bolt in a state sandwiched between facing surfaces of two counterpart members and seals a space to be sealed defined by the two counterpart members. In order to locally improve a planar pressure when being brought into close contact with the facing surfaces during sealing, on a substrate constituting the metal gasket, a full bead is formed by bending so as to form a mountain-shaped protruding surface on one side in a thickness direction.

FIG. 6 is a sectional view illustrating a state in which a portion of the full bead of a prior-art metal gasket is cut along a width direction of the full bead.

The full bead 100c of this type of metal gasket 100 is formed by bending so that the mountain-shaped protruding surface is formed on the one side (lower side in FIG. 6) in the thickness direction of the substrate 101 and a valley-shaped recessed surface is formed on the other side (upper side in FIG. 6) in the thickness direction.

If the metal gasket 100 is made only by a single metal substrate, it cannot follow surface roughness of the facing surface of the counterpart member, and a sufficient sealing function cannot be obtained in some cases. Thus, both surfaces of the metal substrate 101 on which the full bead 100c is formed is generally coated (after-coat) with elastic coating 102 made of rubber-state elastic material so as to cover the full bead 100c (Patent Document 1).

PRIOR ART DOCUMENTS

Patent Documents

Patent Document 1: JP-A-2002-13640

SUMMARY

Problem to be Solved by the Invention

However, in the metal gasket 100 of the prior-art technology, when the substrate 101 is subjected to after-coat by the elastic coating 102, the coating material collects in a bottom part on the recessed surface side in the full bead 100c and thus, a thick coating collection 102a can be formed easily in this bottom part. Thus, as illustrated in FIG. 7, when the metal gasket 100 is attached between two counterpart members 200 and 300 and fastened, the thick coating collection 102a interferes rather than the elastic coating 102, and a compression amount of the full bead 100c runs short. As a result, a gap δ is formed between the counterpart members 200 and 300, and there is a concern that sufficient sealing properties cannot be obtained.

The present invention was made in view of the aforementioned points and has an object to enable improvement of the sealing properties by making sufficient compression of the full bead possible even if the elastic coating is formed along the full bead.

The other objects of the present invention will be made apparent from the description below.

Means for Solving Problem

The above-mentioned problems are solved by the following respective inventions.

1. A metal gasket in which a full bead forming a mountain-shaped protruding surface on one side in a thickness direction and forming a valley-shaped recessed surface on the other side in the thickness direction on a metal substrate, characterized in that
   elastic coating is formed on the whole surface of the protruding surface of the full bead; and
   the elastic coating is formed on the recessed surface of the full bead except a slit-shaped elastic coating-free section along a bottom section of the recessed surface.
2. The metal gasket according to 1, wherein
   the elastic coating-free section is formed from the bottom section of the recessed surface of the full bead to an intermediate section of slanted surfaces on both sides thereof.
3. The metal gasket according to 1 or 2, wherein
   the elastic coating on the recessed surface side of the full bead is formed from both hem sections of the full bead to a flat plate section of the substrate.

Effect of the Invention

According to the present invention, even if the elastic coating is formed along the full bead, the full bead can be sufficiently compressed, and sealing properties can be improved.

DETAILED DESCRIPTION OF THE INVENTIONS

A preferred embodiment of a metal gasket according to the present invention will be described below by referring to the attached drawings.

Figure 1:
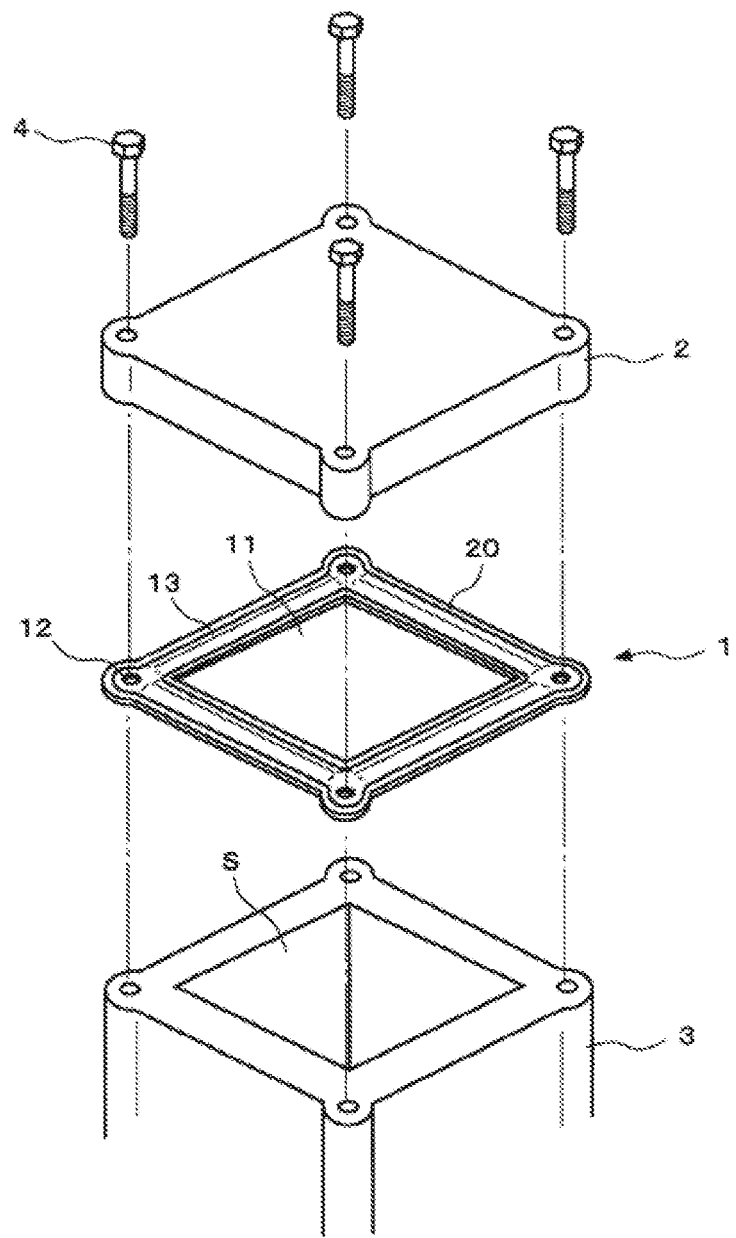
FIG. 1 is an exploded perspective view illustrating an assembled state of a metal gasket according to the present invention.
Figure 2:
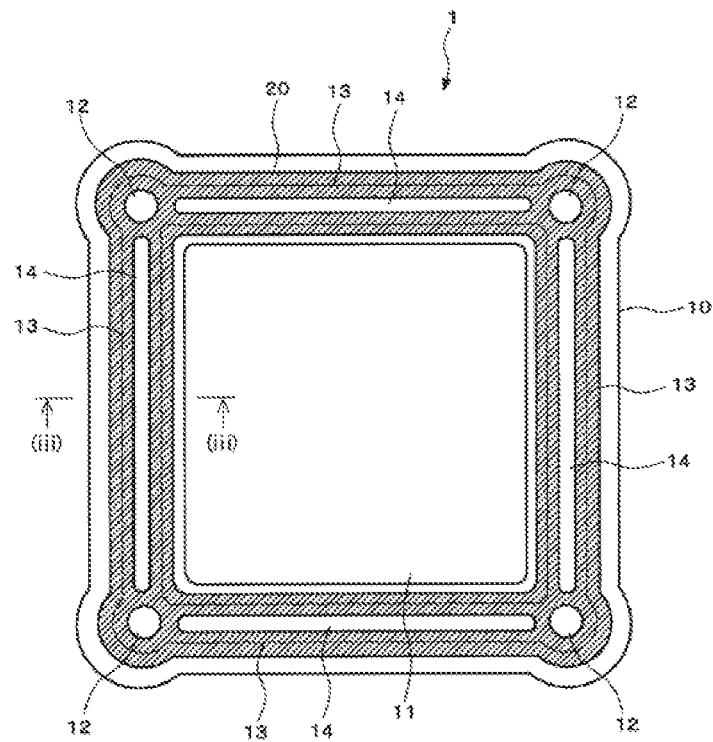
FIG. 2 is a bottom view of the metal gasket illustrated in FIG. 1.
Figure 3:
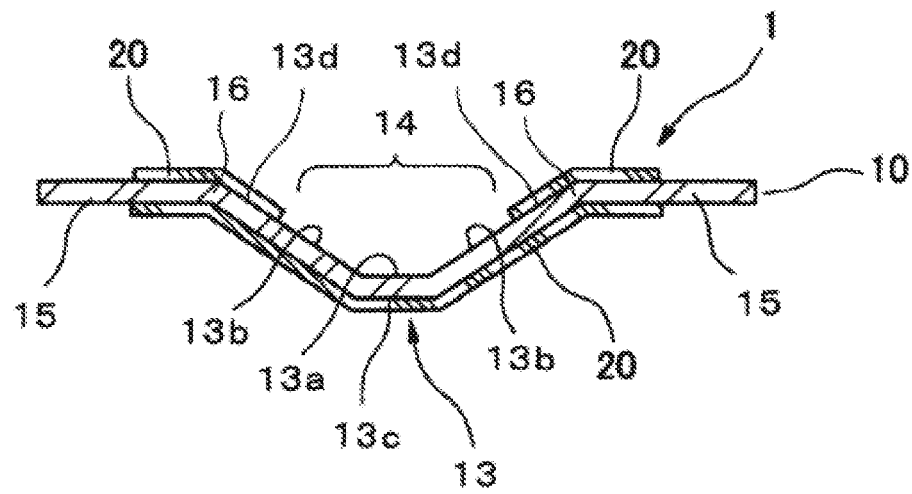
FIG. 3 is an enlarged sectional view along (iii)-(iii) line in FIG. 2.

FIG. 1 is an exploded perspective view illustrating an assembled state of the metal gasket according to the present invention, FIG. 2 is a bottom view of the metal gasket illustrated in FIG. 1, and FIG. 3 is an enlarged sectional view along (iii)-(iii) line in FIG. 2.

The metal gasket 1 according to the present invention is, as illustrated in FIG. 1, arranged between facing surfaces of two counterpart members 2 and 3 defining a sealed target space S and integrally fastened by a bolt 4.

The metal gasket 1 has an opening section 11 corresponding to the sealed target space S and a bolt hole 12 formed in a metal substrate 10 such as stainless, cold-rolled steel plate, zinc-plated steel plate, aluminum alloy sheet and the like, for example.

In the substrate 10, a full bead 13 having spring properties is formed between the adjacent bolt holes 12 and 12. The full bead 13 is formed by bending the substrate 10 between the bolt holes 12 and 12 so that a mountain-shaped protruding surface is formed on one side (lower side in FIG. 3) in a thickness direction and a valley-shaped recessed surface on the other side (upper side in FIG. 3) in the thickness direction.

The substrate 10 is coated (after-coat) by applying elastic coating 20 made of a rubber-state elastic material (a rubber material or a synthetic resin material having rubber-state elasticity) along the full bead 13 as illustrated in FIGS. 2 and 3.

Specifically, the elastic coating 20 is formed on the whole surface of the protruding surface of the full bead 13. Moreover, on the recessed surface of the full bead 13, on a portion along a bottom section 13a of the recessed surface or more specifically, on a region from the bottom section 13a to an intermediate section between slanted surfaces 13b and 13b on both sides thereof, the elastic coating 20 is formed except a slit-shaped elastic coating-free section 14.

That is, as illustrated in FIG. 3, on the protruding surface side of the full bead 13, the elastic coating 20 is applied on the whole surface from parts of flat plate sections 15 and 15 on both sides in a width direction thereof to a top section 13c of the full bead 13. On the other hand, on the recessed surface side of the full bead 13, a region from the bottom section 13a to the intermediate section between the slanted surfaces 13b and 13b on both sides thereof is the elastic coating-free section 14, and the elastic coating 20 is not formed. The elastic coating 20 is applied only on the region from this intermediate section to the parts of the flat plate sections 15 and 15 on both sides thereof.

The elastic coating 20 on the recessed surface side of this full bead 13 is formed from both hem sections 13d and 13d of the full bead 13 to the flat plate sections 15 of the substrate 10. Thus, bent sections 16 and 16 which are boundary sections between the both hem sections 13d and 13d and the flat plate sections 15 and 15 of the full bead 13 are covered by the elastic coating 20.

Figure 4:
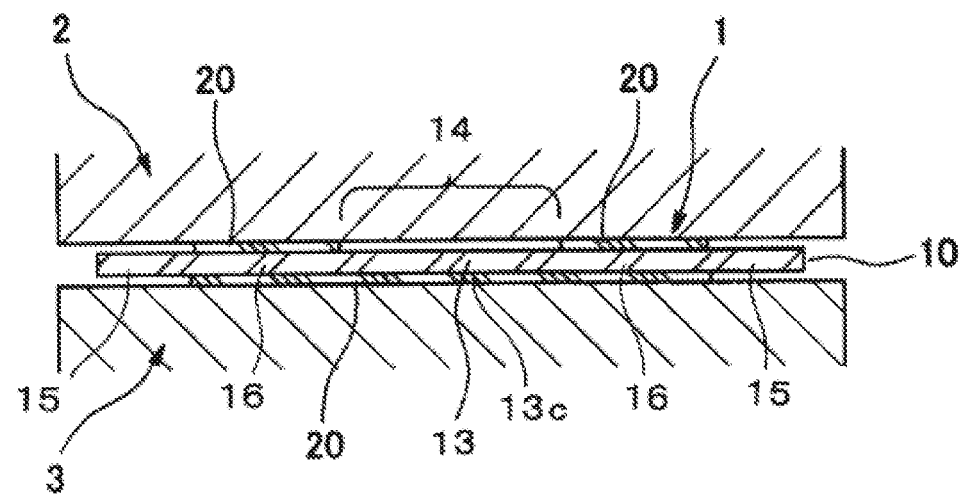
FIG. 4 is a sectional view illustrating an attached state of the metal gasket illustrated in FIG. 3.

Subsequently, a state in which this metal gasket 1 is attached between counterpart members 2 and 3 will be described. FIG. 4 is a sectional view illustrating the attached state of the metal gasket 1 illustrated in FIG. 3.

When this metal gasket 1 is attached between facing surfaces of the counterpart members 2 and 3 and fastened, the full bead 13 is deformed by compression. By means of a compressive reaction force of the full bead 13 at this time, the elastic coating 20 of the top section 13c of the full bead 13 is brought into close contact with the facing surface of the counterpart member 3 at an appropriate planar pressure. At this time, since the elastic coating 20 fully fills surface roughness of the facing surface of the counterpart member 3, the metal gasket 1 exerts an excellent sealing function in combination with the planar pressure exerted by the full bead 13.

Particularly, the bottom section 13a of the recessed surface of the full bead 13 in an unattached state in FIG. 3 is the elastic coating-free section 14 on which the elastic coating 20 is not formed, and coating collection as before is not present on the bottom section 13a. Thus, in the fastened state illustrated in FIG. 4, the full bead 13 can be substantially fully compressed and deformed to a flat surface shape. As a result, generation of a gap caused by compression shortage between the elastic coating 20 and the counterpart members 2 and 3 can be prevented, and a sufficient sealing planar pressure can be obtained. Thus, even if the elastic coating 20 is formed along the full bead 13, the full bead 13 can be sufficiently compressed, and sealing properties can be improved.

Moreover, by providing the elastic coating-free section 14, an area of the elastic coating 20 is decreased. Thus, a material cost can be reduced by decreasing an application amount of a rubber material for molding the elastic coating 20.

Furthermore, since the elastic coating-free section 14 is formed from the bottom section 13a of the recessed surface of the full bead 13 to the intermediate section between the slanted surfaces 13b and 13b on the both sides thereof, occurrence of a gap due to compression shortage can be reliably prevented, and sufficient sealed surface can be ensured.

On the recessed surface side of the full bead 13, too, the bent sections 16 and 16 on which the planar pressure is generated is coated by the elastic coating 20, and the elastic coating-free section 14 is arranged between the bent sections 16 and 16, and thus, the elastic coating 20 coating the bent sections 16 and 16 is brought into close contact with the counterpart member 2, and the surface roughness of the counterpart member 2 can be fully filled. Therefore, the metal gasket 1 can exert the excellent sealing function in combination with the planar pressure exerted by the full bead 13 also on the recessed surface side of the full bead 13.

the metal gasket 1 and the full bead 13 described above, the one having a substantially square plane shape is exemplified, but the plane shapes of the metal gasket and the full bead are not limited at all but can be formed into various shapes according to the shape of the facing surface of the counterpart member to be sealed.

Figure 5:
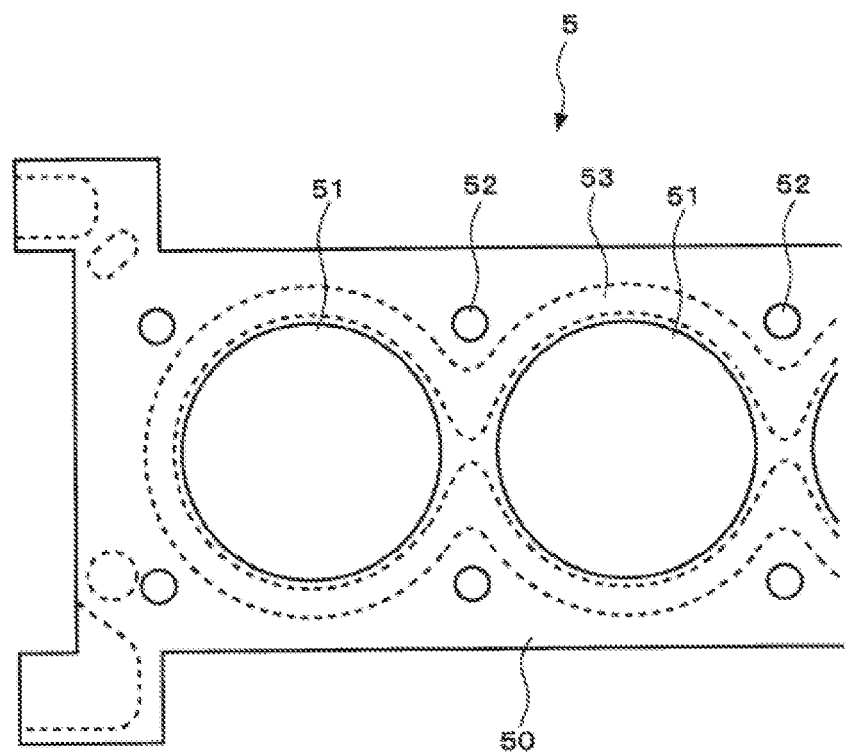
FIG. 5 is a partial plan view illustrating an example of a cylinder-head gasket used for sealing a gap between a cylinder head and a cylinder block of an internal combustion engine of an automobile.
Figure 6:
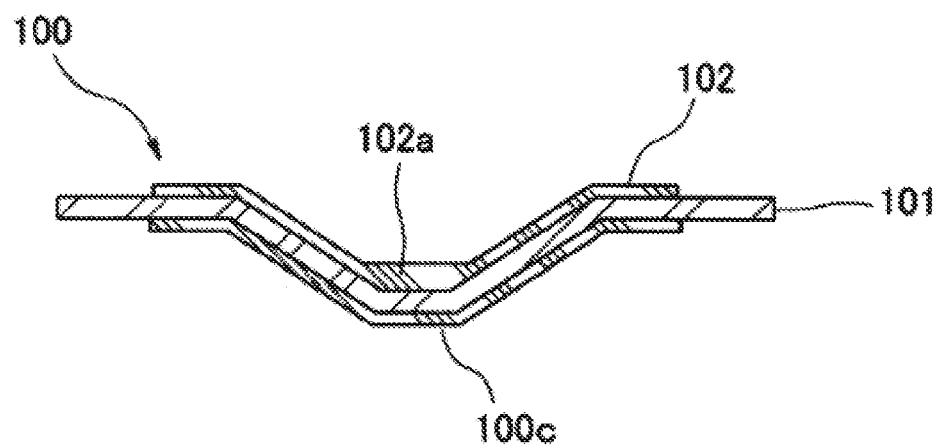
FIG. 6 is a sectional view illustrating a state in which a portion of a full bead of a prior-art metal gasket is cut off along a width direction of the full bead.
Figure 7:
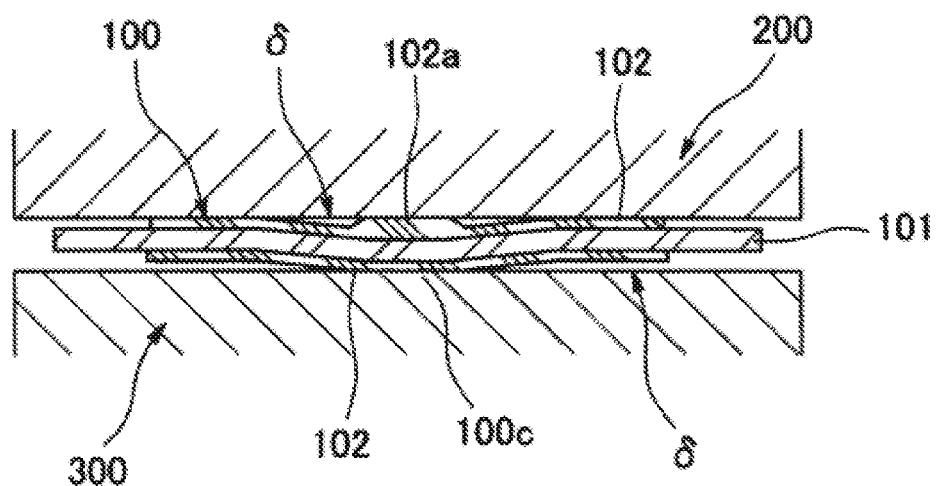
FIG. 7 is a sectional view illustrating an attached state of the prior-art metal gasket illustrated in FIG. 6.

For example, FIG. 5 illustrates an example of a cylinder-head gasket used for sealing a gap between a cylinder head and a cylinder block of an internal combustion engine of an automobile.

In this cylinder-head gasket 5, a plurality of opening sections 51 and bolt holes 52 corresponding to a plurality of combustion chambers of the cylinder block are opened in a metal substrate 50. On a periphery of each of the opening sections 51, a full bead 53 for locally increasing the planar pressure when the cylinder-head gasket 5 is to be fastened between the cylinder head and the cylinder block is formed.

In this cylinder-head gasket 5, too, when the full bead 53 coated with the elastic coating is to be formed on both surfaces of the substrate 50, by forming the slit-shaped elastic coating-free section along the bottom section of the recessed surface of the full bead 53, the effect similar to that of the aforementioned metal gasket 1 can be obtained.

EXPLANATIONS OF LETTERS OR NUMERALS

1: metal gasket
10: substrate
11: opening section
12: bolt hole

13: full bead
13a: bottom section
13b: slanted surface
13c: top section
13d: hem section
14: elastic coating-free section
15: flat plate section
16: bent section
20: elastic coating
2,3: counterpart member
4: bolt
5: cylinder-head gasket
50: substrate
51: opening section
52: bolt hole
53: full bead

We claim:

1. A metal gasket, comprising:
a metal substrate having a first edge, an opposite second edge, and a full bead formed between the first edge and the second edge, the full bead including a protruding surface on one side of the metal substrate in a thickness direction, and the full bead including a recessed surface on the other side of the metal substrate in the thickness direction;
a first rubber elastic coating formed directly on the one side of the metal substrate, and directly on an entirety of the protruding surface of the full bead, the first rubber elastic coating being spaced apart from each of the first edge and the second edge;
a second rubber elastic coating formed directly on the other side of the metal substrate, and directly on the recessed surface of the full bead except a slit-shaped rubber elastic coating-free section along a bottom section of the recessed surface, the second rubber elastic coating being formed from a first and second hemmed section of the recessed surface of the full bead to a flat plate section of the other side of the metal substrate such that the second rubber elastic coating is spaced apart from each of the first edge and the second edge, and such that outer edges of the second rubber elastic coating are aligned with outer edges of the first rubber elastic coating;
the rubber elastic coating-free section is formed from the bottom section of the recessed surface of the full bead to an intermediate section of a pair of slanted surfaces located on opposing sides of the bottom section;
the full bead is configured to be deformed by compression into a flat surface shape and configured to generate a compressive reaction force when the metal substrate is attached between opposed facing surfaces of a pair of opposing counterpart members and fastened; and
the first and second rubber elastic coatings are configured to be brought into close contact with the counterpart members without a gap between the first and second rubber elastic coatings and the facing surfaces of the counterpart members by the compressive reaction force of the full bead such that a surface roughness of the facing surfaces of the counterpart members is filled by the first and second rubber elastic coatings.

2. The metal gasket according to claim 1, wherein each of the intermediate sections of the slanted surfaces are located proximate the flat section.

* * * * *